(12) United States Patent  
Fukino

(10) Patent No.: US 8,705,188 B2
(45) Date of Patent: Apr. 22, 2014

(54) LENS BARREL, IMAGING DEVICE AND MANUFACTURING METHOD THEREOF

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 68 days.

(21) Appl. No.: 13/106,489

(22) Filed: May 12, 2011

(65) Prior Publication Data

US 2011/0286119 A1    Nov. 24, 2011

(30) Foreign Application Priority Data

May 14, 2010 (JP) ................................ 2010-111777

(51) Int. Cl.
*G02B 7/02* (2006.01)

(52) U.S. Cl.
USPC ............................ 359/829; 359/822; 359/815

(58) Field of Classification Search
USPC ........................ 359/811, 813, 815, 819–824
See application file for complete search history.

(56) References Cited

U.S. PATENT DOCUMENTS

| 2007/0177046 | A1* | 8/2007 | Makii | 348/335 |
| 2010/0165493 | A1 | 7/2010 | Fukino et al. | |
| 2011/0286119 | A1* | 11/2011 | Fukino | 359/823 |

FOREIGN PATENT DOCUMENTS

| JP | A-2004-094172 | 3/2004 |
| JP | A-2006-72070 | 3/2006 |
| JP | A-2006-94172 | 4/2006 |
| JP | A-2006-208671 | 8/2006 |

OTHER PUBLICATIONS

Office Action mailed Jan. 31, 2012 issued in Japanese Patent Application 2010-111777 (with translation).
Sep. 11, 2012 Office Action issued in Japanese Patent Application No. 2010-111777 (with translation).

* cited by examiner

*Primary Examiner* — Thomas K Pham
*Assistant Examiner* — Brandi Thomas
(74) *Attorney, Agent, or Firm* — Oliff PLC

(57) ABSTRACT

A lens barrel and imaging device with a low likelihood of optical characteristics being degraded by an impact from a fall or the like may be provided. A lens barrel including: a retention member that retains an optical system; and a first guide shaft that guides the retention member to be movable along an optical axis of the optical system, wherein the retention member includes, a first engaging portion that engages with the first guide shaft, and an abutting portion disposed at the opposite side of the optical axis from the side thereof at which the first engaging portion is disposed, at a position that is offset in the optical axis direction from the engaging portion, the abutting portion being abuttable against an abutted portion when a force in the optical axis direction is applied at least to the retention member.

17 Claims, 8 Drawing Sheets

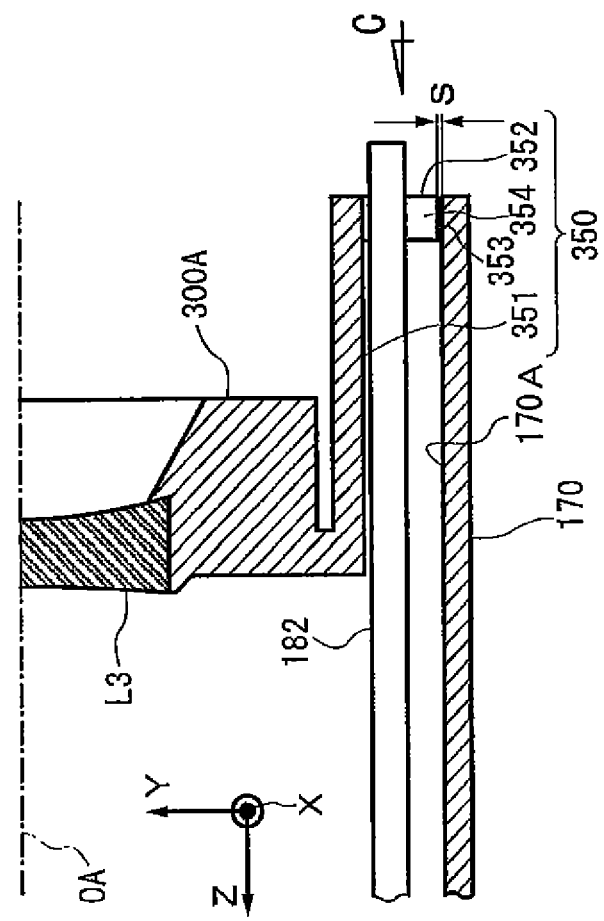

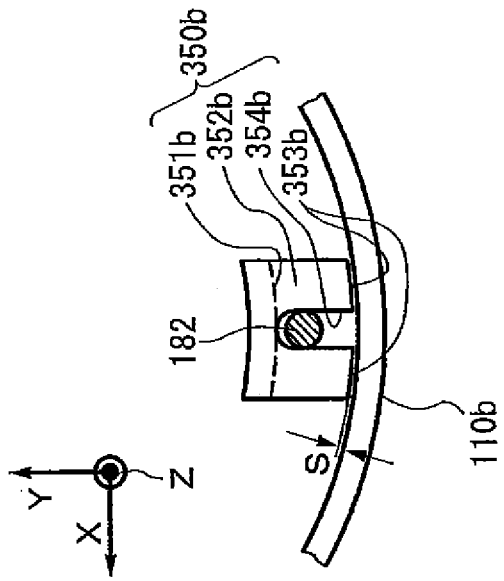
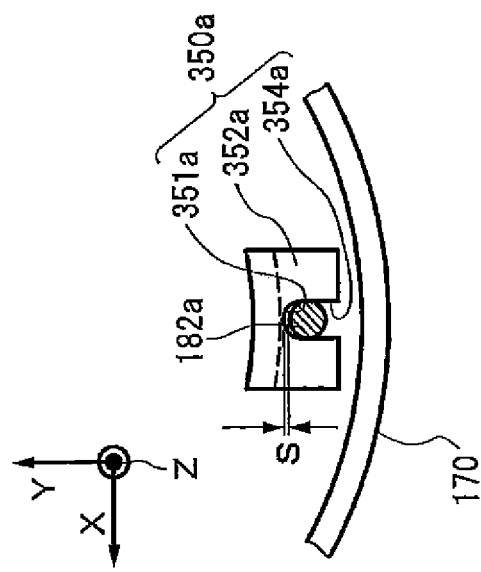

LENS BARREL, IMAGING DEVICE AND MANUFACTURING METHOD THEREOF

BACKGROUND OF THE INVENTION

1. Field of the Invention

The present invention relates to a lens barrel, an imaging device and a lens barrel manufacturing method.

2. Description of Related Art

Heretofore, a lens driving device has been known with a structure that movably supports, with two guide bars, a retaining member (a lens holder) of a movable lens in an imaging optical system (For example, Japanese Unexamined Patent Application Publication No. 2006-208671). This lens holder is slidably fitted to one of the guide bars by a hole and is slidably engaged with the other guide bar by a U-shaped notch portion.

SUMMARY OF THE INVENTION

If the above-mentioned lens driving device is dropped or the like and subjected to a force, the U-shaped notch portion swings due to inertial force about the portion with the hole that is engaged with the guide bar. If the impact is large and the engaging portion swings greatly, the portion in which the penetrating hole is formed may be plastically deformed. As a result, optical characteristics may deteriorate.

An object of the present invention is to provide a lens barrel, imaging device and lens barrel manufacturing method with a low likelihood of optical characteristics being degraded by an impact from a fall or the like.

According to a first aspect of the present invention, there is provided a lens barrel including: a retention member that retains an optical system; and a first guide shaft that guides the retention member to be movable along an optical axis of the optical system, wherein the retention member includes a first engaging portion that engages with the first guide shaft, and an abutting portion disposed at the opposite side of the optical axis from the side thereof at which the first engaging portion is disposed, at a position that is offset in the optical axis direction from the engaging portion, the abutting portion being abuttable against an abutted portion when a force in the optical axis direction is applied at least to the retention member.

The lens barrel may further include a second guide shaft that is disposed to be parallel with the first guide shaft, wherein the retention member includes a second engaging portion that is disposed to oppose the first engaging portion and that engages with the second guide shaft.

The second engaging portion and the abutting portion may be integrally provided.

The lens barrel may further include a driving member that drives the retention member, wherein the abutting portion is abuttable against the driving member.

The lens barrel may further include a support tube that supports the first guide shaft, wherein the abutting portion is abuttable against the support tube.

The abutting portion may be abuttable against the second guide shaft.

The lens barrel may further include a second retention member that integrally retains a plurality of other optical systems different from the optical system and that includes another engaging portion that engages with the first guide shaft, and the retention member is disposed between the plurality of other optical systems.

The abutting portion may be plurally provided, at different positions in the optical axis direction.

The abutting portion may include a groove portion with a shape that opens to an outer periphery side.

According to a second aspect of the present invention, there is provided an imaging device including a lens barrel described above.

According to a third aspect of the present invention, there is provided a lens barrel manufacturing method including: providing a retention member retaining an optical system, providing a first guide shaft that guides the retention member to be movable along an optical axis of the optical system, and providing the retention member with a first engaging portion that engages with the first guide shaft, and an abutting portion disposed at the opposite side of the optical axis from the side thereof at which the first engaging portion is disposed, at a position that is offset in the optical axis direction from the engaging portion, the abutting portion being abuttable against an abutted portion when a force in the optical axis direction is applied at least to the retention member.

The lens barrel manufacturing method may further include: disposing a second guide shaft to be parallel with the first guide shaft; and providing the retention member with a second engaging portion that is disposed to oppose the first engaging portion and that engages with the second guide shaft.

The second engaging portion and the abutting portion may be integrally provided.

The lens barrel manufacturing method may further include: providing a driving member that drives the retention member, wherein the abutting portion is abuttable against the driving member.

The lens barrel manufacturing method may further include: providing a support tube that supports the first guide shaft, wherein the abutting portion is abuttable against the support tube.

The abutting portion may be abuttable against the second guide shaft.

The lens barrel manufacturing method may further include: providing a second retention member that integrally retains a plurality of other optical systems different from the optical system and that includes another engaging portion that engages with the first guide shaft; and disposing the retention member between the plurality of other optical systems.

The abutting portion may be plurally provided, at different positions in the optical axis direction.

In the lens barrel manufacturing method may further include: providing the abutting portion with a groove portion with a shape that opens to an outer periphery side.

According to the present invention, a lens barrel, imaging device and lens barrel manufacturing method with a low likelihood of optical characteristics being degraded by an impact from a fall or the like may be provided.

BRIEF DESCRIPTION OF THE DRAWINGS

FIG. 6A and FIG. 6B are diagrams illustrating a variant example of the present invention.

FIG. 7A and FIG. 7B are diagrams illustrating variant examples of the present invention.

DETAILED DESCRIPTION OF THE INVENTION

Herebelow, embodiments of the present invention are described with reference to the attached drawings and suchlike.

Figure 1:
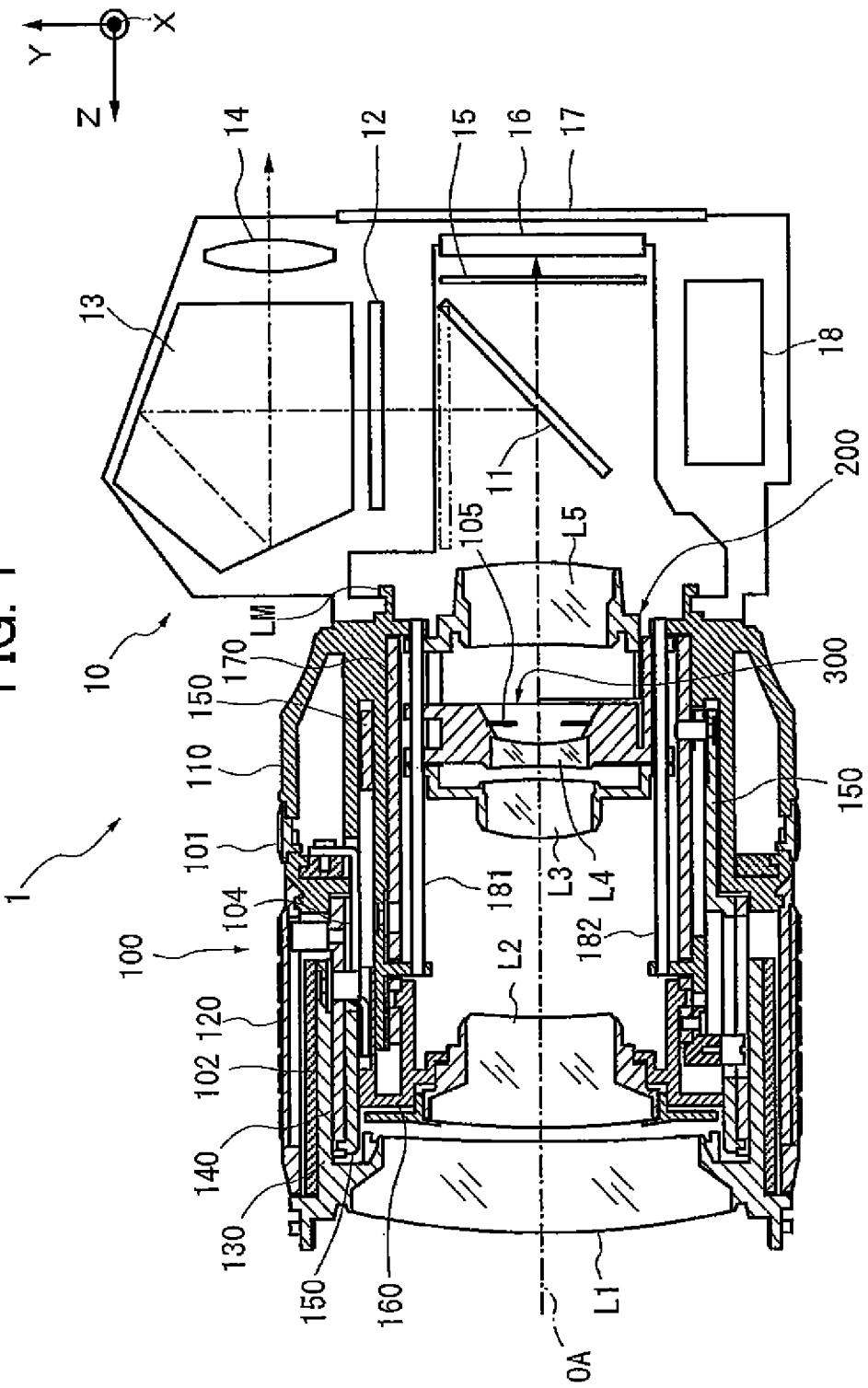
FIG. 1 is a diagram schematically illustrating a camera that is an embodiment relating to the present invention.

FIG. 1 is a diagram schematically illustrating a camera 1 that is an embodiment relating to the present invention.

To facilitate description and understanding of the drawings hereinafter, an orthogonal XYZ coordinate system is provided. In this co-ordinate system, given a position of the camera in which a photographer is keeping an optical axis OA horizontal and photographing a landscape orientation image (hereinafter referred to as a regular position), a direction to leftward from the photographer's point of view is the +X direction, the direction to upward in the regular position is the +Y direction, and the direction toward the object in the regular position is the +Z direction. The +Z direction is referred to as the front face side, and the −Z direction is referred to as the rear face side. Movement in a direction parallel to the optical axis OA (that is, the Z axis) is referred to as translation, and rotation about the optical axis OA is referred to as turning.

The camera 1 is a camera constituted by a camera body 10 and a lens barrel 100.

The lens barrel 100 is what is known as a zoom lens, which may be adjusted to alter the focusing distance. The lens barrel 100 is provided with a plural number of lens units (L1 to L5) that constitute an imaging optical system, and an aperture 105 whose opening diameter is altered to adjust an amount of incident light.

The lens barrel 100 is also provided with a lens mount LM that detachably engages with a camera mount. The lens barrel 100 is detachably mounted to the camera body 10 by this lens mount LM. Therefore, the camera 1 may perform imaging with different lens barrels 100 being interchanged in accordance with different applications.

The camera body 10 is equipped with a quick return mirror 11, a viewfinder screen 12, a pentaprism 13, an eyepiece optical system 14, a shutter 15, an imaging component 16, a display device 17, a control device 18 and so forth.

The quick return mirror 11 is a mirror that is provided to be capable of swinging inside the camera body 10 to deflect the light path of an object image focused by the lens barrel 100 toward the viewfinder screen 12. In response to a shutter release operation, the quick return mirror 11 moves to a withdrawn position (illustrated by a two-dot chain line in FIG. 1) in which the quick return mirror 11 does not impede incidence of the object light on the imaging component 16.

The viewfinder screen 12 is a screen on which the subject image reflected by the quick return mirror 11 is focused. The viewfinder screen 12 is disposed between the quick return mirror 11 and the pentaprism 13. The pentaprism 13 guides the image focused at the viewfinder screen 12 to the eyepiece optical system 14, as an upright image.

The eyepiece optical system 14 is disposed at a rear face side (photographer side) of the pentaprism 13. The eyepiece optical system 14 is an optical system for magnified viewing of the object image that is formed as an upright image by the pentaprism 13.

The shutter 15 opens and closes in response to the shutter release operation, and controls an exposure time of the object image that is focused on the imaging component 16.

The imaging component 16 is, for example, an optoelectronic conversion component such as a CCD or the like that converts the object image focused by the lens barrel 100 to electronic signals. The imaging component 16 is disposed at the rear face side of the interior of the camera body 10 (the right side as illustrated in FIG. 1), in an attitude in which a light detection surface thereof is orthogonal to the optical axis OA.

The display device 17 is provided with a display panel of liquid crystal or the like that is disposed at the outside of the rear face side (the photographer side) of the camera body 10. The display device 17 displays imaged images, information relating to imaging such as exposure times and so forth, and the like at the display panel.

The control device 18 is constituted to include a CPU and suchlike and performs overall control of the structural elements of the camera body 10 described above and of the lens barrel 100.

The camera body 10 is integrally joined to the lens barrel 100 as described above to constitute the camera 1. In the joined state, the control device 18 of the camera body 10 and an unillustrated power supply are connected to the lens barrel 100 via unillustrated connection terminals, and a focusing motor, the aperture 105 and the like of the lens barrel 100 are controlled and driven by the control device 18.

At a time of imaging, the camera 1 operates as described below.

When an unillustrated shutter release button provided at the camera body 10 is operated by pressing (the shutter release operation), the quick return mirror 11 moves to the withdrawn position. The shutter 15 opens and closes in response to the shutter release operation, and allows object light to be exposed onto the imaging component 16 for a predetermined duration. The imaging component 16 converts the object image light to electronic signals to implement imaging. The image data imaged by the imaging component 16 is recorded at an unillustrated recording unit. Thus, imaging is performed. During this imaging, the aperture 105, focusing motor and the like of the lens barrel 100 are controlled and driven by the control device 18 of the camera body 10. Specifically, the control device 18 controls and drives the aperture 105 in accordance with detection information from an unillustrated light measurement sensor provided at the camera body 10, and controls and drives the focusing motor in accordance with detection information from an unillustrated focus sensor.

Figure 2:
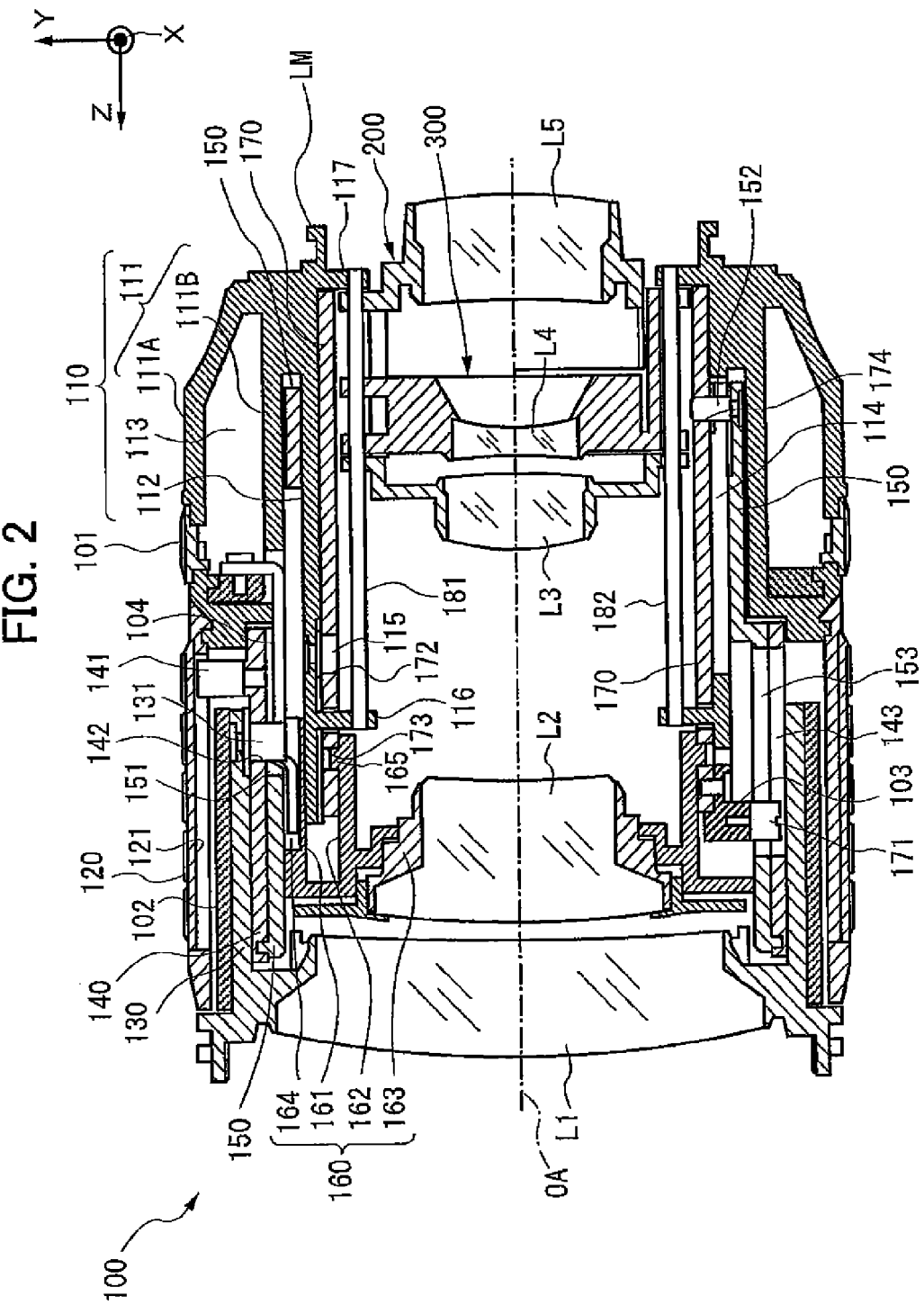
FIG. 2 is a magnified diagram of a lens barrel in FIG. 1.
Figure 3:
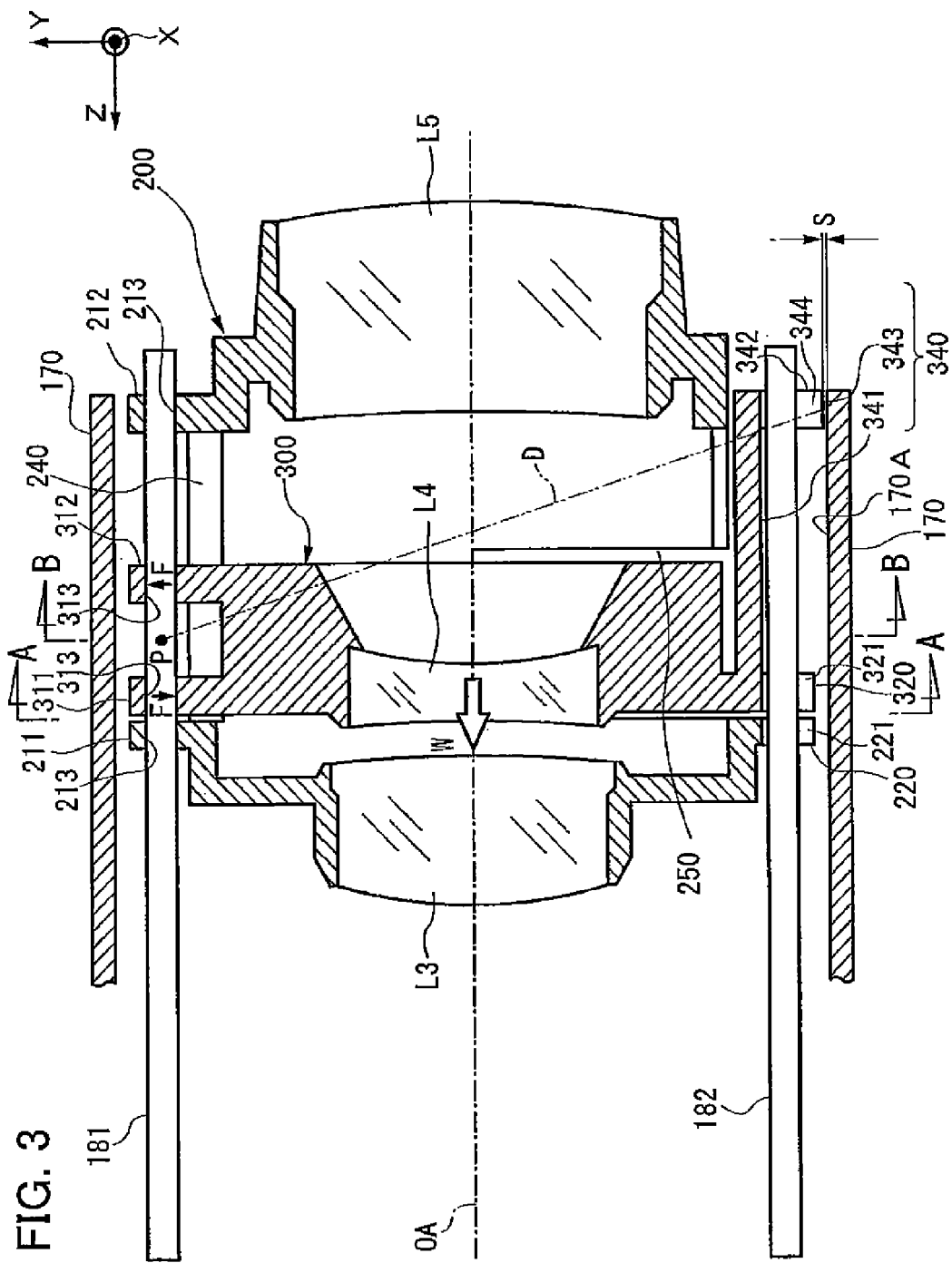
FIG. 3 is a partial magnified diagram illustrating a movement-guiding structure of a third and fifth unit retention frame of the lens barrel.
Figure 4:
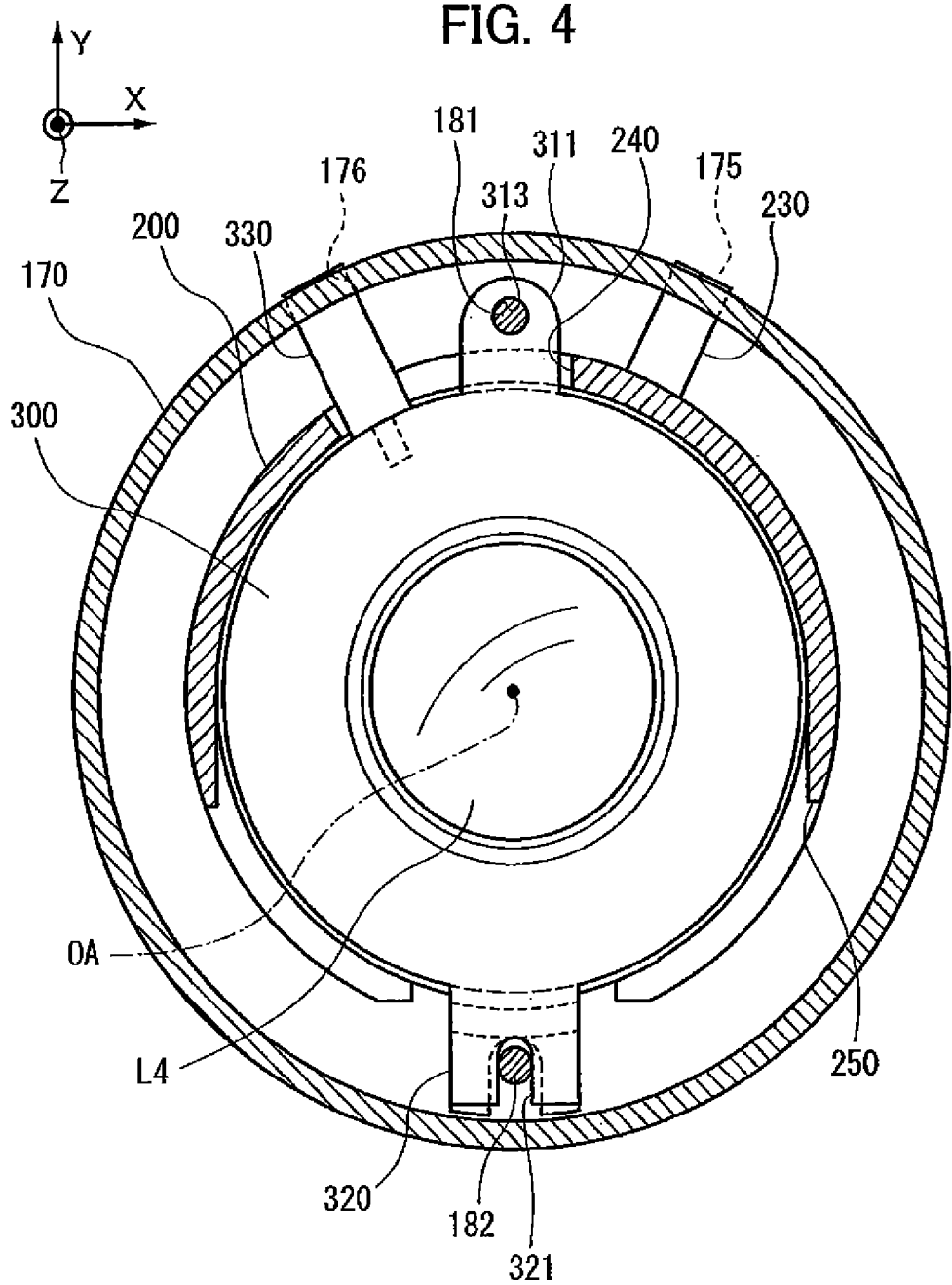
FIG. 4 is a sectional diagram taken along A-A of FIG. 3.
Figure 5:
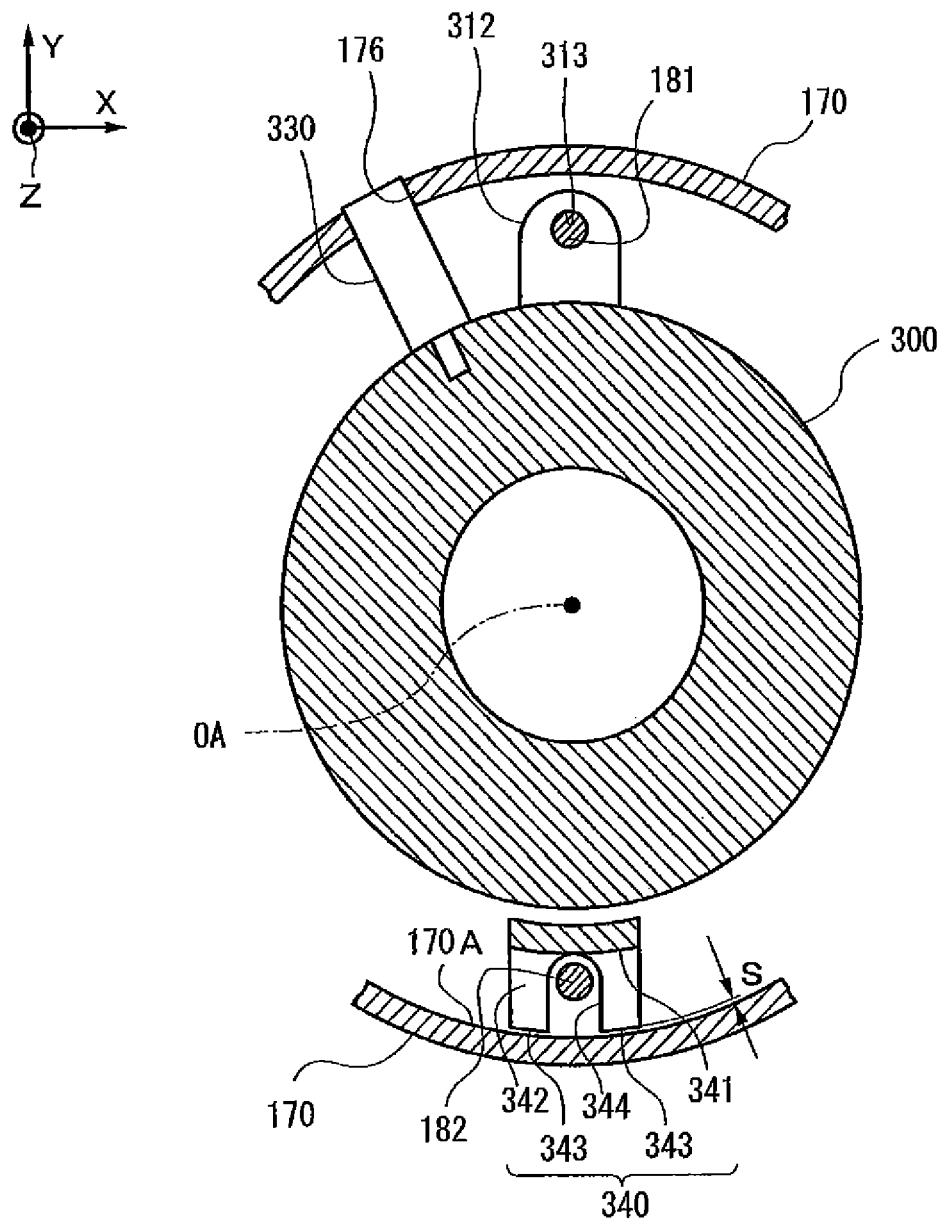
FIG. 5 is a sectional diagram taken along B-B of FIG. 3.

Next, the lens barrel 100 is described in more detail, referring to FIG. 2 to FIG. 5 as well as the above-mentioned FIG. 1. FIG. 2 is a magnified diagram of the lens barrel 100 in FIG. 1. FIG. 3 is a partial magnified diagram illustrating a movement-guiding structure of a third and fifth unit retention frame 200 of the lens barrel 100. FIG. 4 is a sectional diagram taken along A-A of FIG. 3. FIG. 5 is a sectional diagram taken along B-B of FIG. 3.

As mentioned above, the lens barrel 100 is a zoom lens equipped with five lens units (L1 to L5), and is mounted to the camera body 10 via the lens mount LM, which is provided at a rear end portion of the lens barrel 100. Changes to the focusing distance of the lens barrel 100 (zooming) are implemented by movements of the lens units (L1 to L5) in the direction of the optical axis OA.

FIG. 2 illustrates the components at the wide angle end. To the tele side, the lens units (L1 to L5) are respectively moved by predetermined amounts toward the object from the state illustrated in FIG. 2, and the first lens unit L1 protrudes forward.

The lens barrel 100 is equipped with a fixed tube 110, a focus operation ring 101 that is provided to be turnable at the outer periphery of a front end vicinity of the fixed tube 110, and a zoom operation ring 120 that is provided at a front end portion of the fixed tube 110.

The fixed tube 110 is constituted by an outer tube portion 111 that forms an outer face of the lens barrel 100 and an inner tube portion 112, disposed at the inner periphery side thereof, being joined and made integral at a base end portion (rear end). The lens mount LM is fixed at an end portion at the rear face side of the fixed tube 110.

The outer tube portion 111 is provided with a tubular outer periphery wall 111A that forms the outer periphery surface of the lens barrel 100 and a tubular inner periphery wall 111B that forms an inner periphery surface of the lens barrel 100. The outer periphery wall 111A and the inner periphery wall 111B have a predetermined spacing in the diametric dimension, and a space therebetween serves as a motor chamber 113 that accommodates the unillustrated focusing motor.

The inner tube portion 112 has a circular tube shape with a predetermined thickness, and is concentrically disposed at the inner periphery side of the outer tube portion 111. A predetermined spacing is specified between the outer periphery face of the inner tube portion 112 and the inner periphery face of the outer tube portion 111. The front end portion of the inner tube portion 112 protrudes toward the object side by a predetermined amount relative to the front end of the outer tube portion 111, as far as an inner periphery region of the zoom operation ring 120.

The inner tube portion 112 is provided with an inner tube translation groove 114 and a cam tube operation pin 115. The inner tube translation groove 114 is formed to be parallel with the optical axis OA. A translation inner tube pin 152 of a translation inner tube 150 that is described below slidably fits into the inner tube translation groove 114. The cam tube operation pin 115 protrudes from the inner periphery face of the inner tube portion 112, and slidably fits into an operated cam groove 172 of a cam tube 170 that is described below.

At both front and rear end portions of the inner periphery side of the inner tube portion 112, support portions 116 and 117, respectively, are provided. The support portions 116 and 117 support guide bars 181 and 182 that are described below.

The focus operation ring 101 is mounted to be turnable at the outer periphery of the outer tube portion 111 of the fixed tube 110. The focus operation ring 101 links to a linked operation lever 104 that is described below, via the unillustrated focusing motor disposed in the motor chamber 113. The linked operation lever 104 may be turned by a turning operation of the focus operation ring 101.

The zoom operation ring 120 has a circular tube shape with a predetermined length, and is mounted to the distal end of the outer tube portion 111 of the fixed tube 110 to be turnable but immovable in the optical axis OA direction. An operation guiding groove 121 that is parallel with the optical axis OA is formed in the inner periphery of the zoom operation ring 120. An operated pin 141, which is provided protruding from an intermediate operation ring 140 that is described below, slidably fits into the operation guiding groove 121.

The following are respectively concentrically disposed between the zoom operation ring 120 and the inner tube portion 112 of the fixed tube 110, in this order from the outer periphery side: a cover tube 102; a first unit retention tube 130 that retains the first lens unit L1; the intermediate operation ring 140; the translation inner tube 150; and a second unit retention tube 160 that retains the second lens unit L2.

The cam tube 170 is concentrically disposed at the inner periphery side of the inner tube portion 112 of the fixed tube 110. The cam tube 170 fits into the inner periphery of the inner tube portion 112 to be turnable and movable in the optical axis direction.

The pair of guide bars 181 and 182 are disposed at the inner periphery side of the cam tube 170. The third and fifth unit retention frame 200, which is supported at the guide bars 181 and 182 and supports a third lens unit L3 and a fifth lens unit L5, is also disposed at the inner periphery side of the cam tube 170. A fourth unit retention frame 300 that supports the fourth lens unit L4 is disposed inside the third and fifth unit retention frame 200.

The cover tube 102 has a circular tube shape with a predetermined length, and slidably fits over the outer periphery of the first unit retention tube 130 described below. The cover tube 102 translates in accordance with translation of the first unit retention tube 130 and covers a gap between the first unit retention tube 130 and the zoom operation ring 120, and prevents the ingression of dust and the like into the interior of the lens barrel 100.

The first unit retention tube 130 has a circular tube shape with a predetermined length, and retains the first lens unit L1 at a front end portion thereof. A first unit pin 131 is provided protruding from the inner periphery face of the first unit retention tube 130 at a rear end portion vicinity thereof. The first unit pin 131 slidably penetrates through a first unit operation cam hole 142 that is formed in the intermediate operation ring 140 described below. A distal end of the first unit pin 131 slidably fits into a first unit translation groove 151 that is formed in the translation inner tube 150 described below.

Thus, turning of the first unit retention tube 130 is restricted by the first unit translation groove 151 of the translation inner tube 150, and the first unit retention tube 130 is driven to translate by the first unit operation cam hole 142 when the intermediate operation ring 140 turns.

The intermediate operation ring 140 has a circular tube shape with a predetermined length. The intermediate operation ring 140 is disposed at the outer periphery of the translation inner tube 150 described below, to be capable of sliding to turn but immovable relative to the translation inner tube 150 in the optical axis OA direction.

The intermediate operation ring 140 is provided with the operated pin 141, the first unit operation cam hole 142 and a cam tube translation groove 143. The operated pin 141 protrudes from the outer, periphery face of the intermediate operation ring 140 at a rear end portion vicinity thereof and, as described earlier, slidably fits in the operation guiding groove 121 of the zoom operation ring 120. The first unit operation cam hole 142 is formed at a predetermined angle with respect to the X-axis direction. The first unit pin 131 protruding from the first unit retention tube 130 slidably fits in the first unit operation cam hole 142. The cam tube translation groove 143 is formed to be parallel with the optical axis OA. A cam tube pin 171 that is provided at a front portion of the cam tube 170 described below slidably fits in the cam tube translation groove 143.

The intermediate operation ring 140 operates in conjunction with turning of the zoom operation ring 120, via the operated pin 141, and is driven to turn. The intermediate operation ring 140 translates in accordance with translation of the translation inner tube 150 that is described below.

The translation inner tube 150 has a substantially circular tube shape with a predetermined length, and a rear end portion thereof slidably fits between the outer tube portion 111 and inner tube portion 112 of the fixed tube 110. As mentioned above, the intermediate operation ring 140 is provided at the outer periphery of the front end portion of the translation inner tube 150, and is capable of sliding to turn but is immovable relative to the translation inner tube 150 in the optical axis OA direction.

The translation inner tube 150 is provided with the first unit translation groove 151, the translation inner tube pin 152 and a release hole 153. The first unit translation groove 151 is formed to be parallel with the optical axis OA direction. A distal end of the first unit pin 131 provided protruding from the first unit retention tube 130 slidably fits in the first unit translation groove 151. The translation inner tube pin 152 is provided protruding from the inner periphery face of the translation inner tube 150 at a rear end portion vicinity thereof. The translation inner tube pin 152 slidably penetrates through the inner tube translation groove 114 formed in the inner tube portion 112 of the fixed tube 110, and a distal end of the translation inner tube pin 152 slidably fits in a translation inner tube operation cam groove 174 that is formed in the cam tube 170 described below. The release hole 153 is formed with a size in which the cam tube pin 171, which is provided at a front face portion of the cam tube 170 described below, movably fits with play.

The translation inner tube pin 152 fitting in the translation inner tube operation cam groove 174 of the cam tube 170 described below is operated by turning of the cam tube 170, the translation inner tube pin 152 is guided by the inner tube translation groove 114 of the fixed tube 110, and the translation inner tube 150 translates without turning.

In the second unit retention tube 160, a pair of inner and outer circular tubes—an outer tube 161 and an inner tube 162—are integrated at the front side, and the second unit retention tube 160 is formed with a predetermined length. The second unit retention tube 160 retains the second lens unit L2 at the inner periphery of the inner tube 162, via a lens frame 163. The inner periphery of the outer tube 161 of the second unit retention tube 160 slidably fits over the outer periphery of the inner tube portion 112 of the fixed tube 110.

The second unit retention tube 160 is provided with an operated groove 164 and a second unit pin 165.

The operated groove 164 is formed at the outer periphery face of the outer tube 161 to be parallel with the optical axis OA. The linked operation lever 104, which is described below, slidably fits in the operated groove 164. The second unit pin 165 is provided protruding from the outer periphery face of the inner tube 162 at a rear end vicinity thereof. The second unit pin 165 slidably fits in the second unit operation cam groove 173 of the cam tube 170.

Because of the linked operation lever 104 fitting in the operated groove 164 and the second unit pin 165 fitting in the second unit operation cam groove 173 of the cam tube 170, the second unit retention tube 160 translates without turning in accordance with turning and translation of the cam tube 170 described below. The second unit retention tube 160 is driven to turn by turning of the linked operation lever 104 by the focus operation ring 101 or the unillustrated focusing motor. When the second unit retention tube 160 turns, the second unit retention tube 160 translates in accordance with the second unit operation cam groove 173 of the cam tube 170 into which the second unit pin 165 is fitted.

The cam tube 170 has a circular tube shape with a predetermined length, and fits into the inner periphery of the inner tube portion 112 of the fixed tube 110 to be turnable and translatable.

The cam tube 170 is provided with the cam tube pin 171, which protrudes from the outer periphery side at a front end portion thereof, through a support member 103. Via the release hole 153 formed in the translation inner tube 150, the cam tube pin 171 fits in the cam tube translation groove 143 formed in the intermediate operation ring 140 that is disposed at the outer periphery side of the cam tube pin 171.

The cam tube 170 is also provided with the operated cam groove 172, a second unit operation cam groove 173 and the translation inner tube operation cam groove 174. The operated cam groove 172 is formed at a predetermined angle with respect to the X-axis direction. The cam tube operation pin 115 that is provided protruding from the inner tube portion 112 fits in the operated cam groove 172. The second unit operation cam groove 173 is formed in the outer periphery face at the front side of the cam tube 170, at a predetermined angle with respect to the X-axis direction. The second unit pin 165 that is provided protruding from the second unit retention tube 160 fits in the second unit operation cam groove 173. The translation inner tube operation cam groove 174 is formed in the outer periphery face at the rear side of the cam tube 170, at a predetermined angle with respect to the X-axis direction. The translation inner tube pin 152 that is provided protruding from the translation inner tube 150 slidably fits in the second unit operation cam groove 173.

As illustrated in FIG. 4 and FIG. 5 (although not represented in FIG. 2), the cam tube 170 is provided with a third and fifth unit operation cam hole 175 and a fourth unit operation cam hole 176. The third and fifth unit operation cam hole 175 is formed at a predetermined angle with respect to the X-axis direction. An operated pin 230, which is provided protruding from the third and fifth unit retention frame 200 that is described below, slidably fits in the third and fifth unit operation cam hole 175. The fourth unit operation cam hole 176 is formed at a predetermined angle with respect to the X-axis direction. An operated pin 330, which is provided protruding from the fourth unit retention frame 300 that is described below, slidably fits in the fourth unit operation cam hole 176.

Because of the cam tube 170 fitting in the cam tube translation groove 143 of the intermediate operation ring 140, the cam tube 170 is driven to turn in accordance with turning of the intermediate operation ring 140. When the cam tube 170 turns, the cam tube 170 is operated by the operated cam groove 172 into which the cam tube operation pin 115 of the cover tube 102 fits, and the cam tube 170 translates.

When the cam tube 170 turns and translates thus, the cam tube 170 drives the second unit retention tube 160 (and the second lens unit L2), the third and fifth unit retention frame 200 (the third lens unit L3 and the fifth lens unit L5) and the fourth unit retention frame 300 (the fourth lens unit L4) to translate.

The guide bars 181 and 182 are round shaft members with predetermined diameters. Front and rear end portions of the guide bars 181 and 182 are fixed to the support portions 116 and 117, respectively, that are provided at the inner tube portion 112 of the fixed tube 110. The guide bars 181 and 182 are disposed at the inner periphery side of the cam tube 170 to be parallel with the optical axis OA.

The guide bars 181 and 182 are disposed to sandwich the optical axis OA at positions with vertical symmetry in FIG. 2. That is, the guide bar 181 is disposed at the upper side of FIG. 2 and the guide bar 182 is disposed at the lower side. In the following descriptions, the side at which the guide bar 181 is disposed is referred to as "the upper side" and the side at which the guide bar 182 is disposed is referred to as "the lower side".

The guide bars 181 and 182 movably support the third and fifth unit retention frame 200 and the fourth unit retention frame 300 in the optical axis OA direction.

The third and fifth unit retention frame 200 is formed as a circular tube with a predetermined length, retains the third lens unit L3 at a front end portion thereof, and retains the fifth lens unit L5 at a rear end portion. The fourth unit retention frame 300 is disposed inside the third and fifth unit retention frame 200.

As illustrated in FIG. 3, the third and fifth unit retention frame 200 is provided with guide shaft bearing portions 211 and 212, which are provided at front and rear end portions, respectively, at the upper side of the third and fifth unit retention frame 200, and a anti-rotation engaging portion 220 that is provided protruding to the lower side at the front end portion. Bearing holes 213 are formed penetrating through the guide shaft bearing portions 211 and 212 in parallel with the optical axis OA. The guide bar 181 slidably fits through each of the bearing holes 213. An engaging groove 221 is formed in the anti-rotation engaging portion 220. The engaging groove 221 is formed in a U shape that opens downward. A width (spacing between opposing faces) of the engaging groove 221 is specified such that the guide bar 182 slidably fits therein.

As illustrated in FIG. 4, the third and fifth unit retention frame 200 is provided with the operated pin 230 and with opening portions 240 and 250. The operated pin 230 is provided protruding from the outer periphery face of the third and fifth unit retention frame 200, and fits in the third and fifth unit operation cam hole 175 formed at the cam tube 170. The opening portion 240 is formed in the third and fifth unit retention frame 200 centrally above the optical axis OA direction, and the opening portion 250 is formed in the third and fifth unit retention frame 200 centrally below the optical axis OA direction.

The guide bar 181 at the upper side slidably fits in the bearing holes 213 of the guide shaft bearing portions 211 and 212, and the guide bar 182 at the lower side slidably fits in the engaging groove 221 of the anti-rotation engaging, portion 220. Thus, the third and fifth unit retention frame 200 is supported by the guide bars 181 and 182 to be translatable while maintaining its attitude with respect to the optical axis OA. That is, the fitting of the bearing holes 213 of the guide shaft bearing portions 211 and 212 with the guide bar 181 guides movement in the translation direction, and the fitting of the engaging groove 221 of the anti-rotation engaging portion 220 with the guide bar 182 prevents the third and fifth unit retention frame 200 from turning about the guide bar 181.

In accordance with turning and translation of the cam tube 170, the third and fifth unit retention frame 200 is operated by the third and fifth unit operation cam hole 175 in which the operated pin 230 fits, and is translated.

The fourth unit retention frame 300 has a circular ring shape, retains the fourth lens unit L4 and, as mentioned above, is disposed inside the third and fifth unit retention frame 200.

As illustrated in FIG. 3 and FIG. 4, the fourth unit retention frame 300 is provided with guide shaft bearing portions 311 and 312, which are provided at front and rear end portions at the upper side of the fourth unit retention frame 300, a anti-rotation engaging portion 320 that is provided protruding to the lower side at the front end portion, the operated pin 330 and an impact receiving portion 340.

Bearing holes 313 are formed penetrating through the guide shaft bearing portions 311 and 312 in parallel with the optical axis OA. The guide bar 181 slidably fits through each of the bearing holes 313. The guide shaft bearing portions 311 and 312 protrude to the outer periphery side through the opening portion 240 of the third and fifth unit retention frame 200, and the guide bar 181 fits in the bearing holes 313.

An engaging groove 321 is formed in the anti-rotation engaging portion 320. The engaging groove 321 is formed in a U shape that opens downward. The width (spacing between opposing faces) of the engaging groove 321 is specified such that the guide bar 182 slidably fits therein. The anti-rotation engaging portion 320 protrudes to the outer periphery side through the opening portion 250 of the third and fifth unit retention frame 200, and the guide bar 182 fits in the engaging groove 321.

The operated pin 330 is provided protruding from the outer periphery face of the fourth unit retention frame 300. The operated pin 330 protrudes to the outer periphery side through the opening portion 240 of the third and fifth unit retention frame 200, and fits in the fourth unit operation cam hole 176 formed in the cam tube 170.

An arm 341 is provided extending rearward (to the −Z side) from the anti-rotation engaging portion 320, and the impact receiving portion 340 is provided with an abutting surface 343 at the outer periphery side of a distal end portion of the arm 341. The impact receiving portion 340 functions to prevent the fourth unit retention frame 300 tilting with respect to a plane orthogonal to the optical axis OA by pivoting about the support points of the guide shaft bearing portions 311 and 312 supported at the guide bar 181. The impact receiving portion 340 is described in detail hereafter.

The upper side guide bar 181 slidably fits in the bearing holes 313 of the guide shaft bearing portions 311 and 312, and the lower side guide bar 182 slidably fits in the engaging groove 321 of the anti-rotation engaging portion 320. Thus, the fourth unit retention frame 300 is supported by the guide bars 181 and 182 to be translatable while maintaining its attitude with respect to the optical axis OA. That is, the fitting of the bearing holes 313 of the guide shaft bearing portions 311 and 312 with the guide bar 181 guides movement in the translation direction, and the fitting of the engaging groove 321 of the anti-rotation engaging portion 320 with the guide bar 182 prevents the fourth unit retention frame 300 from turning about the guide bar 181.

In accordance with turning and translation of the cam tube 170, the fourth unit retention frame 300 is operated by the fourth unit operation cam hole 176 in which the operated pin 330 fits, and is translated.

In the lens barrel 100 structured as described above, the second unit pin 165 of the second unit retention tube 160 is driven to translate by turning of the second unit retention tube 160 retaining the second lens unit by, via the linked operation lever 104, a turning operation of the focus operation ring 101 or the unillustrated focusing motor disposed in the motor chamber 113. Thus, the second unit retention tube 160 translates while turning and the focusing position changes.

Further, in accordance with a turning operation of the zoom operation ring 120 of the lens barrel 100, the intermediate operation ring 140 turns and translates, the translation inner tube 150 translates, and the cam tube 170 turns and translates. Thus, the first unit retention tube 130 retaining the first lens unit, the second unit retention tube 160 retaining the second lens unit, the third and fifth unit retention frame 200 retaining the third and fifth lens units, and the fourth unit retention frame 300 retaining the fourth lens unit are respectively translated, and the focusing distance changes.

Next, the impact receiving portion 340 of the fourth unit retention frame 300 is described in more detail.

As illustrated in FIG. 3 and FIG. 5, the impact receiving portion 340 is provided with the arm 341, which is provided extending rearward from the anti-rotation engaging portion 320, an abutting portion 342 that is provided protruding to the outer periphery side of the distal end portion of the arm 341, and the abutting surface 343, which is an outer periphery face of the abutting portion 342.

The arm 341 is provided extending rearward from the anti-rotation engaging portion 320 to a predetermined length, with the same width as the anti-rotation engaging portion 320 in the circumferential direction. The length of the arm 341 (more precisely, a distance in the Z-axis direction between the abutting surface 343 formed at the distal end thereof and the guide shaft bearing portions 311 and 312) is preferably as long as possible.

The abutting portion 342 protrudes to the outer periphery side at the distal end of the arm 341. The abutting portion 342 is formed in a plate shape with a predetermined thickness in the optical axis OA direction and a width equal to the arm 341 in the circumferential direction. An escape groove 344 that avoids interference with the guide bar 182 is formed in the middle of the abutting portion 342 in the width direction thereof.

The escape groove 344 is formed in a U shape that opens to the outer periphery side, at the middle of the abutting portion 342. The escape groove 344 is formed with a size (width and depth) such that inner periphery faces thereof do not touch the peripheral surface of the guide bar 182.

The end face at the outer periphery side of the abutting portion 342 serves as the abutting surface 343, with a circular arc shape that matches up with an inner periphery face 170A of the opposing cam tube 170. Because the escape groove 344 is formed in the abutting portion 342 as described above, the abutting surface 343 is divided into two parts in the circumferential direction by the escape groove 344.

A predetermined gap S is specified between the abutting surface 343 and the inner periphery face 170A of the cam tube 170.

The gap S is specified by adding a movement amount in a range in which the guide shaft bearing portions 311 and 312 elastically deform if the fourth unit retention frame 300 is twisted with respect to the guide bar 181 (a range in which no plastic deformation or damage occurs) to a minimum gap with which the abutting surface 343 does not touch the inner periphery face of the cam tube 170 if the fourth unit retention frame 300 is offset by a fitting tolerance between the bearing holes 313 of the guide shaft bearing portions 311 and 312 and the guide bar 181. That is, the fourth unit retention frame 300 is specified such that, although the fitting tolerance between the bearing holes 313 of the guide shaft bearing portions 311 and 312 and the guide bar 181 is extremely small, the fourth unit retention frame 300 may swing to pivot about the guide shaft bearing portions 311 and 312, but the abutting surface 343 does not touch the inner periphery face 170A of the cam tube 170 due to this swinging.

The impact receiving portion 340 structured as described above operates as described below.

When a force toward the rear face side (a force in the −Z direction) acts on the lens barrel 100 (for example, when the lens barrel 100 is pointed downward and dropped and the front end strikes a floor surface), an inertial force toward the front side (in the +Z direction) acts on the fourth unit retention frame 300 at the center of gravity position of the fourth unit retention frame 300, as indicated by arrow W in FIG. 3. This force acts to cause the fourth unit retention frame 300 to swing in the clockwise direction of FIG. 3, pivoting about the portion thereof that is supported by the guide bar 181 (for example, the point P in FIG. 3 between the guide shaft bearing portions 311 and 312). In this structure, the anti-rotation engaging portion 320 does not have a function of suppressing swinging of the fourth unit retention frame 300 in this direction.

When the fourth unit retention frame 300 tries to swing in this direction, the abutting surface 343 of the impact receiving portion 340 moves more greatly in accordance with the further distance from the fulcrum of swinging P (the distance D), and the abutting surface 343 promptly abuts against the inner periphery face 170A of the cam tube 170. Thus, the impact receiving portion 340 prevents the fourth unit retention frame 300 from swinging further. Thus, damage due to the guide shaft bearing portions 311 and 312 being excessively twisted may be prevented. That is, in a structure that is not provided with the impact receiving portion 340, there would be a risk of the fourth unit retention frame 300 swinging about the guide shaft bearing portions 311 and 312, a force being applied to the guide shaft bearing portions 311 and 312 by the guide bar 181 relatively in the direction indicated by the arrow F in FIG. 3 and, particularly, the guide shaft bearing portion 312 with the smaller thickness being damaged. In contrast, with the present structure, this kind of problem may be prevented from occurring by the operation of the impact receiving portion 340. Herein, the arm 341 of the impact receiving portion 340 is constituted with a strength so as not to be excessively deformed or damaged by the action of expected impacts.

According to the present embodiment, the following advantageous effects are provided.

(1) The impact receiving portion 340 of the fourth unit retention frame 300 of the lens barrel 100 is provided with the abutting surface 343, for which a predetermined gap S between the abutting surface 343 and the inner periphery face 170A of the cam tube 170 is specified. When the abutting surface 343 swings due to a force toward the front face side acting on the fourth unit retention frame 300, the abutting surface 343 abuts against the inner periphery face 170A of the cam tube 170, and the fourth unit retention frame 300 is restrained from swinging further. Therefore, damage due to the guide shaft bearing portions 311 and 312 twisting excessively may be prevented.

(2) The Gap S between the abutting surface 343 of the impact receiving portion 340 and the inner periphery face 170A is set to a minimum gap at which the abutting surface 343 will not touch the inner periphery face 170A of the cam tube 170 even if the fourth unit retention frame 300 swings about the guide shaft bearing portions 311 and 312. Therefore, during usual translation in which the fourth unit retention frame 300 is guided to move by the guide bars 181 and 182, the abutting surface 343 does not touch the inner periphery face 170A of the cam tube 170 and cause resistance.

Figure 8:
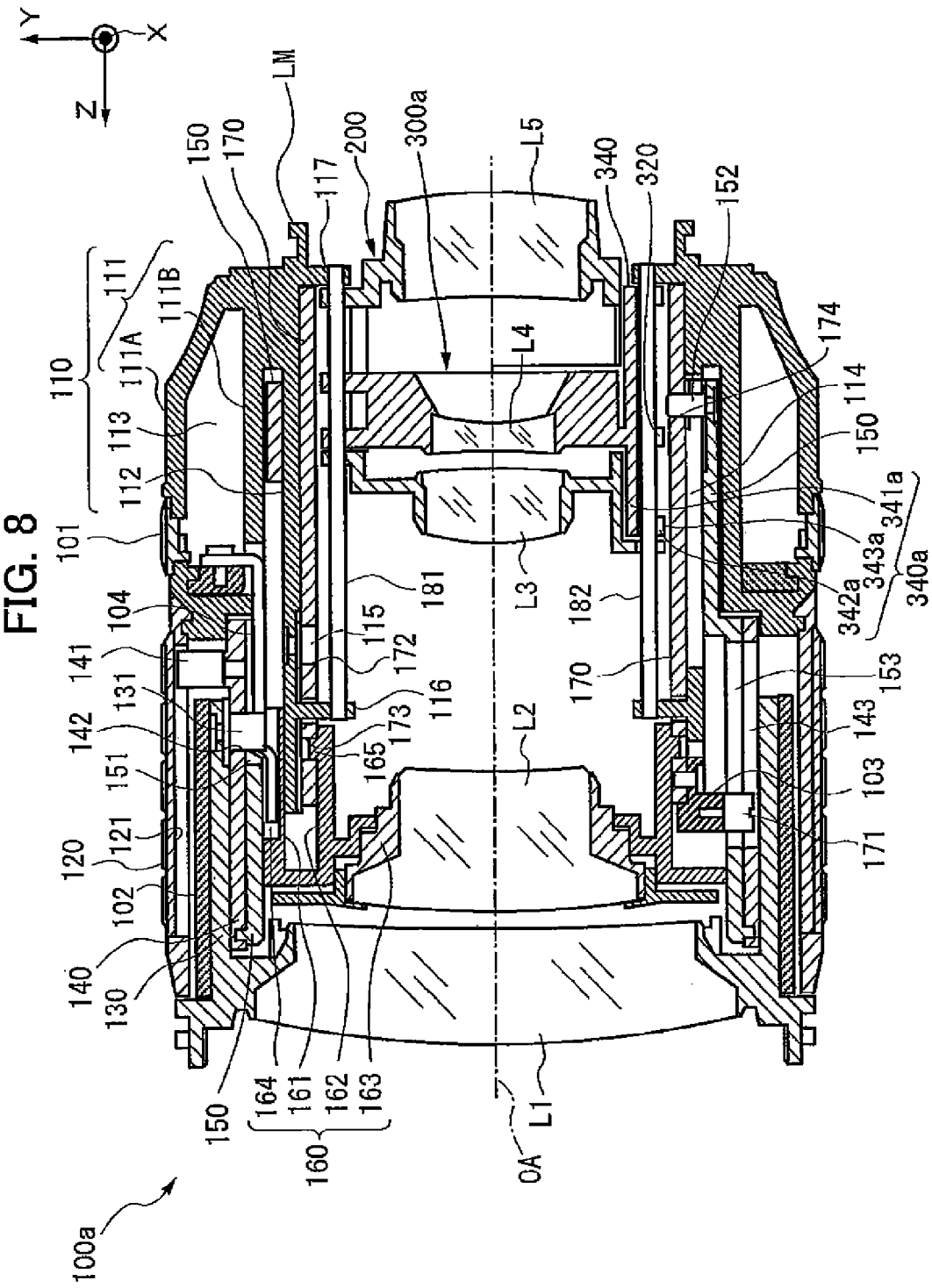
FIG. 8 is a diagram illustrating structure of a lens barrel of another embodiment of the present invention.

FIG. 8 is a diagram illustrating a structure of a lens barrel 100a of another embodiment of the present invention. Similarly to the lens barrel 100, the lens barrel 100a includes a lens mount LM and is detachably mounted to the camera body 10. The lens barrel 100a of FIG. 8 differs from the lens barrel 100 of FIG. 2 in the structure of a fourth unit retention frame 300a. In other respects, the lens barrel 100a has the same structure as the lens barrel 100, and members that are the same are assigned the same reference numerals as in FIG. 2.

Portions of the fourth unit retention frame 300a that engage with the guide bar 181 have the same structure as in the fourth unit retention frame 300. At the guide bar 182 side of the fourth unit retention frame 300a, the anti-rotation engaging portion 320 and impact receiving portions 340 and 340a are provided. The anti-rotation engaging portion 320 and the impact receiving portion 340 are the same as at the impact receiving portion 340 of FIG. 3, and the impact receiving portion 340 is provided extending rearward (toward the lens mount LM) from the anti-rotation engaging portion 320. In contrast, the impact receiving portion 340a is provided extending forward (to the opposite side from the lens mount LM) from the anti-rotation engaging portion 320. The impact receiving portion 340a is provided with an arm 341a that is provided extending forward from the anti-rotation engaging portion 320, an abutting portion 342a that is provided protruding to the outer periphery side of a distal end portion of the arm 341a, and an abutting surface 343a that is an outer periphery face of the abutting portion 342a. Although provided at different positions, the arm 341a, abutting portion 342a and abutting surface 343a are the same, respectively, as the arm 341, abutting portion 342 and abutting surface 343 of FIG. 3.

The impact receiving portion 340a structured as described above operates similarly to the operation of the impact receiving portion 340 when a force acts in the same direction as when the impact receiving portion 340 described above operates (a force in the −Z direction).

When a force in the direction opposite to that when the impact receiving portion 340 described above operates (a force in the +Z direction) acts (for example, if the lens barrel 100a is pointed upward and dropped and strikes against a floor surface), the lens barrel 100a operates as follows.

In this case, an inertial force to rearward (in the −Z direction) acts at the center of gravity position of the fourth unit retention frame 300a. As a result, the fourth unit retention frame 300a acts to swing in the anticlockwise direction of FIG. 8, pivoting about the portions supported by the guide bar 181.

When the fourth unit retention frame 300a tries to swing in this direction, the abutting surface 343a abuts against the inner periphery face 170A of the cam tube 170, and the impact receiving portion 340a prevents the fourth unit retention frame 300a from swinging further.

As described above, according to the lens barrel 100a of FIG. 8, when a force acts, whether it is a force toward the front side or toward the rearward side of the lens barrel 100a, damage due to the guide shaft bearing portions 311 and 312 of the fourth unit retention frame 300a being excessively twisted may be prevented.

Variant Examples

The present invention is not limited to the embodiment described above. Numerous modifications and improvements are possible, as illustrated below, and fall within the technical scope of the present invention.

(1) In the above embodiments, the anti-rotation engaging portion 320 and the impact receiving portion 340 of the fourth unit retention frame 300 are provided respectively separately. However, a constitution is possible in which the two are combined. FIG. 6A is a partial diagram of a fourth unit retention frame 300A that is provided with a detent and impact receiving portion 350 that serves as an example of this constitution. FIG. 6B is a diagram viewed in the direction of arrow C.

The detent and impact receiving portion 350 is provided with an arm 351 that is provided extending rearward from a lower portion of the fourth unit retention frame 300, an abutting portion 352 that is provided protruding to the outer periphery side of a distal end portion of the arm 351, an abutting surface 353 that is at the outer periphery side of the abutting portion 352, and an engaging groove 354 that engages with the guide bar 182.

The abutting portion 352 is provided protruding to the outer periphery side from the distal end of the arm 351, and the end face at the outer periphery side of the abutting portion 352 serves as the abutting surface 353.

The abutting surface 353 is formed in a circular arc shape that matches up with the inner periphery face 170A of the opposing cam tube 170. The spacing between the abutting surface 353 and the inner periphery face 170A of the cam tube 170 is specified to be the gap S.

The engaging groove 354 is formed at the middle of the abutting portion 352 in the width direction thereof. The engaging groove 354 is formed in a U shape that opens to the outer periphery side. The width (spacing between opposing faces) of the engaging groove 354 is specified such that the guide bar 182 slidably fits therein.

According to the structure of this detent and impact receiving portion 350, shape may be simplified, fabrication of the fourth unit retention frame 300 may be made easier, and costs may be reduced.

(2) In the above embodiments, the abutting surface 343 of the fourth unit retention frame 300 abuts against the inner periphery face 170A of the cam tube 170 and blocks the fourth unit retention frame 300 from swinging further. However, a member that abuts against and regulates swinging of the fourth unit retention frame is not limited to the cam tube 170 and may be, for example, a guide bar.

FIG. 7A illustrates an example in which swinging of the fourth unit retention frame is restricted by a guide bar 182a. At an impact receiving portion 350a illustrated in FIG. 7A, a spacing between a floor portion 351a of a U-shaped engaging groove 354a and a peripheral surface of the guide bar 182a is specified to be the gap S. Hence, excessive swinging of the fourth unit retention frame is prevented by the floor portion 351a of the engaging groove 354a abutting against the guide bar 182a.

(3) Further, the member that abuts against and regulates swinging of the fourth unit retention frame 300 may be a fixed tube 110b. FIG. 7B illustrates an example in which swinging of the fourth unit retention frame is regulated by the fixed tube 110b.

An end face at an outer periphery side of an abutting portion 352b illustrated in FIG. 7B serves as an abutting surface 353b. The abutting surface 353b opposes the fixed tube 110b, and is formed in a circular arc shape that matches up with an inner periphery face of the fixed tube 110b. The spacing between the abutting surface 353b and the fixed tube 110b is specified to be the gap S. Hence, excessive swinging of the fourth unit retention frame is prevented by the abutting surface 353b of the abutting portion 352b abutting against the fixed tube 110b.

(4) In the above embodiments, the engaging groove 321 of the anti-rotation engaging portion 320 of the fourth unit retention frame 300 and the escape groove 344 of the impact receiving portion 340 are formed in U shapes that open to the outer periphery side. However, they may have the forms of long holes that are not opened to the outer periphery side.

(5) In the above embodiments, the impact receiving portion 340 of the fourth unit retention frame 300 is provided with the abutting surface 343 at the distal end of the arm 341 that extends rearward from the fourth unit retention frame 300, and the impact receiving portion 340 blocks swinging in which a lower portion of the fourth unit retention frame 300 moves forward pivoting around the guide shaft bearing portions 311 and 312. However, the direction in which swinging is restricted is not limited thus. A structure is possible in which an abutting surface is provided at the front side of the fourth unit retention frame 300 and blocks the fourth unit retention frame 300 from swinging rearward. A further structure is possible in which an abutting surface is provided at both the front and rear sides and blocks swinging to both sides.

(6) In the above embodiment, the abutting surface 343 of the impact receiving portion 340 is disposed to sandwich the guide bar 182 from both sides in the circumferential direction.

However, the arrangement of the abutting surface 343 is not limited thus. The abutting surface 343 may be suitably specified without positions of arrangement thereof being limited to the vicinity of the guide bar 182, provided the abutting surface 343 is at the opposite side from a portion at which the fourth unit retention frame 300 is supported (the guide shaft bearing portions 211 and 212), sandwiching the optical axis OA.

The above embodiments and variant examples may be combined and used as appropriate. This will be clear from the illustrations and descriptions of the structures of the embodiments, so detailed descriptions are not given here. The present invention is not to be limited by the embodiments described above.

What is claimed is:

1. A lens barrel comprising:
    a retention member that retains an optical system;
    a first guide shaft that guides the retention member to be movable along an optical axis of the optical system; and
    a second guide shaft that is disposed outside of the optical system so as to be parallel with the first guide shaft,
    wherein the retention member includes:
    a first engaging portion that engages with the first guide shaft;
    a second engaging portion that engages with the second guide shaft, the second engaging portion being disposed at an opposite side to the first engaging portion relative to the optical axis; and
    an abutting portion disposed at a position that is offset in the optical axis direction from the first engaging portion, the abutting portion being disposed to an arm portion extending from the second engaging portion along the second guide shaft, the abutting portion having an abutting surface extending along a direction intersecting with a diametric dimension of the optical system, the abutting surface being abuttable against an abutted portion when a force in the optical axis direction is applied at least to the retention member.

2. The lens barrel according to claim 1, wherein the second engaging portion and the abutting portion are integrally provided.

3. The lens barrel according to claim 1, further comprising a driving member that drives the retention member,
    wherein the abutting portion is abuttable against the driving member.

4. The lens barrel according to claim 1, further comprising a support tube that supports the first guide shaft,
    wherein the abutting portion is abuttable against the support tube.

5. The lens barrel according to claim 1, wherein the abutting portion is abuttable against the second guide shaft.

6. The lens barrel according to claim 1, comprising a second retention member that integrally retains a plurality of other optical systems different from the optical system and that includes another engaging portion that engages with the first guide shaft, and
    the retention member is disposed between the plurality of other optical systems.

7. The lens barrel according to claim 1, wherein the abutting portion is plurally provided, at different positions in the optical axis direction.

8. The lens barrel according to claim 5, wherein the abutting portion includes a groove portion with a shape that opens to an outer periphery side.

9. An imaging device comprising a lens barrel according to claim 1.

10. A lens barrel manufacturing method comprising:
    providing a retention member retaining an optical system;
    providing a first guide shaft that guides the retention member to be movable along an optical axis of the optical system;
    providing a second guide shaft that is disposed outside of the optical system so as to be parallel with the first guide shaft;
    providing the retention member with a first engaging portion that engages with the first guide shaft;
    providing a second engaging portion that engages with the second guide shaft, the second engaging portion being disposed at an opposite side to the first engaging portion relative to the optical axis; and
    providing an abutting portion disposed at a position that is offset in the optical axis direction from the first engaging portion, the abutting portion being disposed to an arm portion extending from the second engaging portion along the second guide shaft, the abutting portion having an abutting surface extending along a direction intersecting with a diametric dimension of the optical system, the abutting surface being abuttable against an abutted portion when a force in the optical axis direction is applied at least to the retention member.

11. The lens barrel manufacturing method according to claim 10, wherein
    the second engaging portion and the abutting portion are integrally provided.

12. The lens barrel manufacturing method according to claim 10,
    further comprising providing a driving member that drives the retention member,
    wherein the abutting portion is abuttable against the driving member.

13. The lens barrel manufacturing method according to claim 10,
    further comprising providing a support tube that supports the first guide shaft,
    wherein the abutting portion is abuttable against the support tube.

14. The lens barrel manufacturing method according to claim 10, wherein
    the abutting portion is abuttable against the second guide shaft.

15. The lens barrel manufacturing method according to claim 10, further comprising:
    providing
    a second retention member that integrally retains a plurality of other optical systems different from the optical system and that includes another engaging portion that engages with the first guide shaft; and
    disposing the retention member between the plurality of other optical systems.

16. The lens barrel manufacturing method according to claim 10, wherein
    the abutting portion is plurally provided, at different positions in the optical axis direction.

17. The lens barrel manufacturing method according to claim 14, further comprising
    providing the abutting portion with a groove portion with a shape that opens to an outer periphery side.

* * * * *